United States Patent [19]

Rice

[11] 3,869,040

[45] Mar. 4, 1975

[54] CONVEYOR FOR CYLINDRICAL PARTS

[75] Inventor: Daniel L. Rice, Lapeer, Mich.

[73] Assignee: General Motors Corporation, Detroit, Mich.

[22] Filed: M.. 7 1973

[21] Appl. No.: 357,950

[52] U.S. Cl. .............................................. 198/219
[51] Int. Cl. ........................................... B65g 25/04
[58] Field of Search ............ 198/219, 218, 108, 221

[56] References Cited
UNITED STATES PATENTS
3,662,876   5/1972   Hollis .................................. 198/219
FOREIGN PATENTS OR APPLICATIONS
1,280,738   10/1968   Germany ............................ 198/219

Primary Examiner—Evon C. Blunk
Assistant Examiner—Douglas D. Watts
Attorney, Agent, or Firm—Edward J. Biskup

[57] ABSTRACT

An elongated conveyor for moving cylindrical parts along an axis substantially perpendicular to the longitudinal axes of the parts having an entrance end and an exit end and including a pair of laterally spaced supports plates. A series of V-shaped notches are formed in the upper portion of each of the support plates for supporting and axially spacing the cylindrical parts. A plurality of positioning members are provided between the support plates and each of the positioning members is pivotally supported below one of the notches and has the upper portion thereof formed with four angularly related surfaces for cooperation with the notches for controlling successive movement of the cylindrical parts from one notch to the next notch in the direction of the exit end of the conveyor.

3 Claims, 6 Drawing Figures

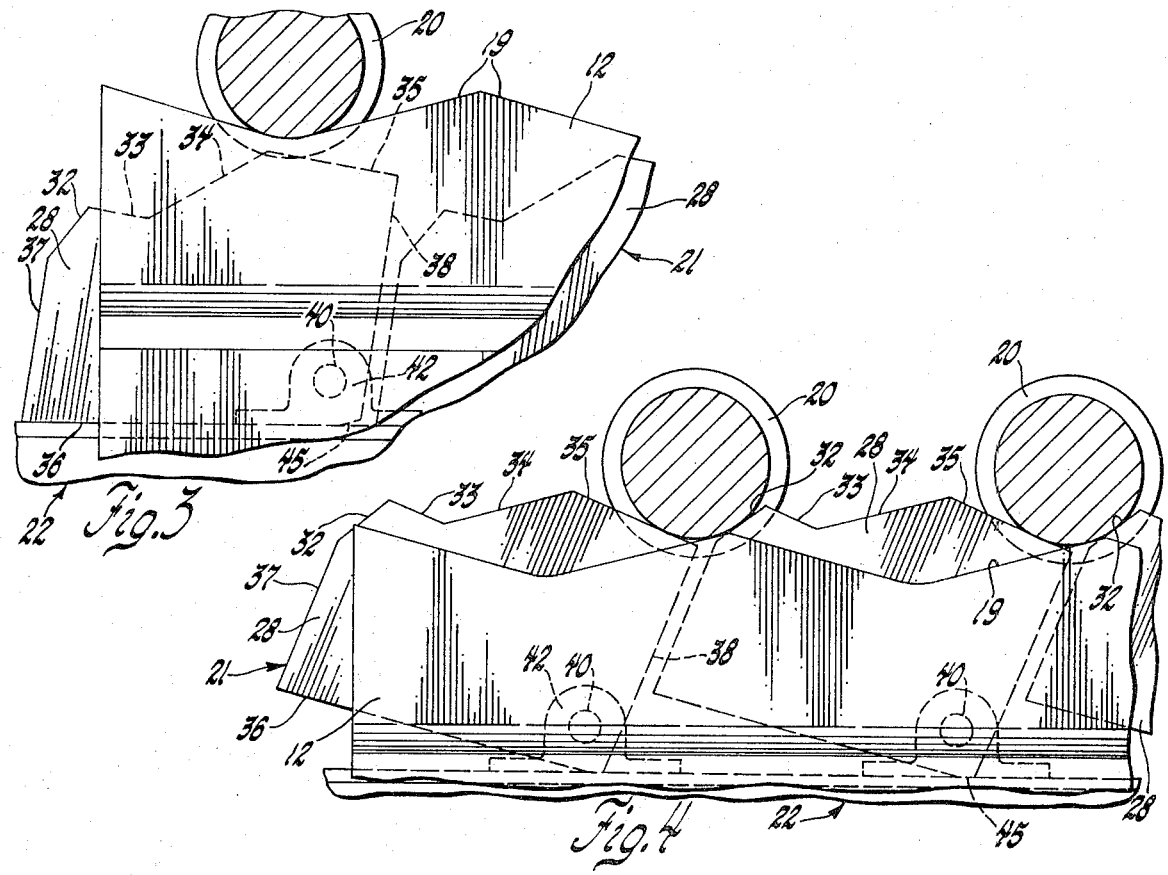
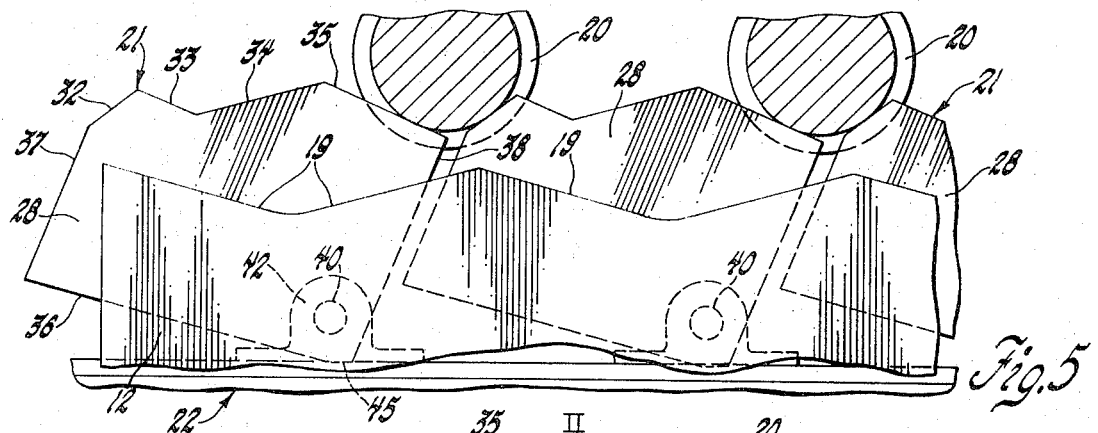
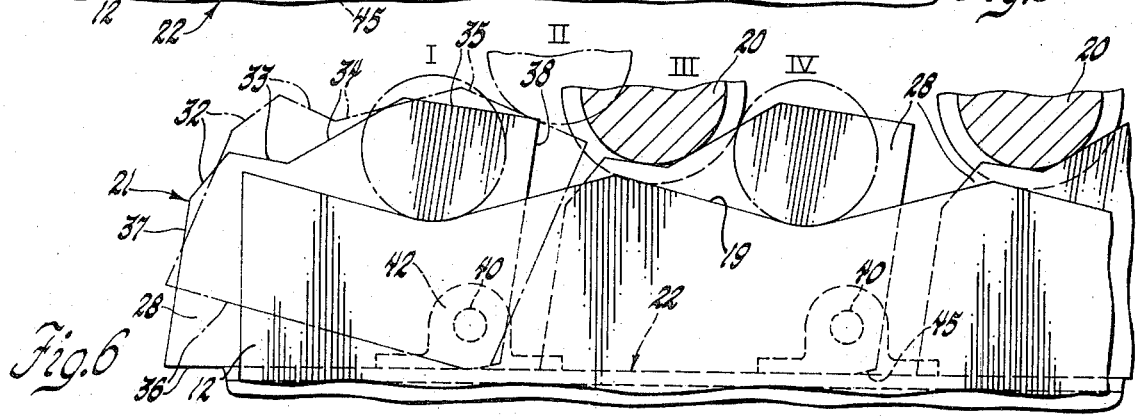

CONVEYOR FOR CYLINDRICAL PARTS

The present invention concerns a conveyor system for transporting cylindrical parts along an axis substantially perpendicular to the longitudinal axis of the parts and is particularly concerned with a conveyor which moves the cylindrical parts individually so that no part-to-part contact occurs and also permits the parts to automatically accumulate when the conveyor is filled so the parts can remain in their respective stations and await transfer to the next location.

More specifically, the invention contemplates a conveyor which includes a pair of laterally spaced support plates the upper portions of which are formed with a series of uniformly spaced V-shaped notches. Each pair of laterally spaced notches is adapted to support an individual cylindrical part along an axis extending transversely to the longitudinal axis of the support plate. The conveyor also includes a plurality of positioning members each of which is supported for pivotal movement between each pair of axially spaced notches and has the upper portion thereof formed with four angularly related surfaces for cooperation with the notches for controlling successive movement of the cylindrical parts from one notch to the next notch in the direction of the exit end of the conveyor. An operating mechanism including a drive assembly is positioned below the positioning members and is adapted to raise and then lower the positioning members relative to the support plates so when the conveyor is filled with cylindrical parts, the positioning members cause each of the cylindrical parts to be removed from its notch by a pair of surfaces formed on an adjoining pair of positioning members and returned to the same notch from which it was removed. When one of the notches is empty, however, upward and then downward movement of the positioning members causes the cylindrical parts preceding the empty notch to be cammed by one surface of one positioning member onto a receiving surface on the adjacent positioning member and deposited by the latter in the associated notch.

The objects of the present invention are to provide a conveyor which will move individual cylindrical parts along an axis substantially perpendicular to the longitudinal axes of the parts; to provide a conveyor having a series of axially spaced V-shaped notches formed in the top portion of a pair of parallel support plates and including an operating mechanism between the plates for moving a cylindrical part to the next notch except when the latter notch is occupied by a cylindrical part; to provide a conveyor system for cylindrical parts that serves to space the parts during movement thereof and causes all of the parts preceding an empty notch to be moved simultaneously towards the empty notch; to provide an accumulating type conveyor having a series of transversely aligned notches for supporting cylindrical parts and provided with positioning members which will successively move cylindrical parts along the longitudinal axis of the conveyor without causing rubbing action between the parts; to provide a material handling device which serves to successively move a plurality of cylindrical parts towards a work station and includes positioning members formed with four angularly related surfaces which cooperate with support notches for guiding the cylindrical parts as the latter from one support notch to the next so as to prevent damage to the parts; to provide an accumulating type conveyor which has a series of transversely aligned support notches and a plurality of positioning members located therebetween which are formed with surfaces which control and guide movement of cylindrical parts from one support notch to the next.

Other objects and advantages of the present invention will be derived from the following detailed description when taken with the drawings in which:

FIG. 3 is an enlarged view showing a positioning member prior to being activated for moving one of the parts supported by the conveyor; and FIGS. 4, 5 and 6 show the positions assumed by the positioning members during operation of the conveyor for transporting cylindrical parts.

Figure 1:
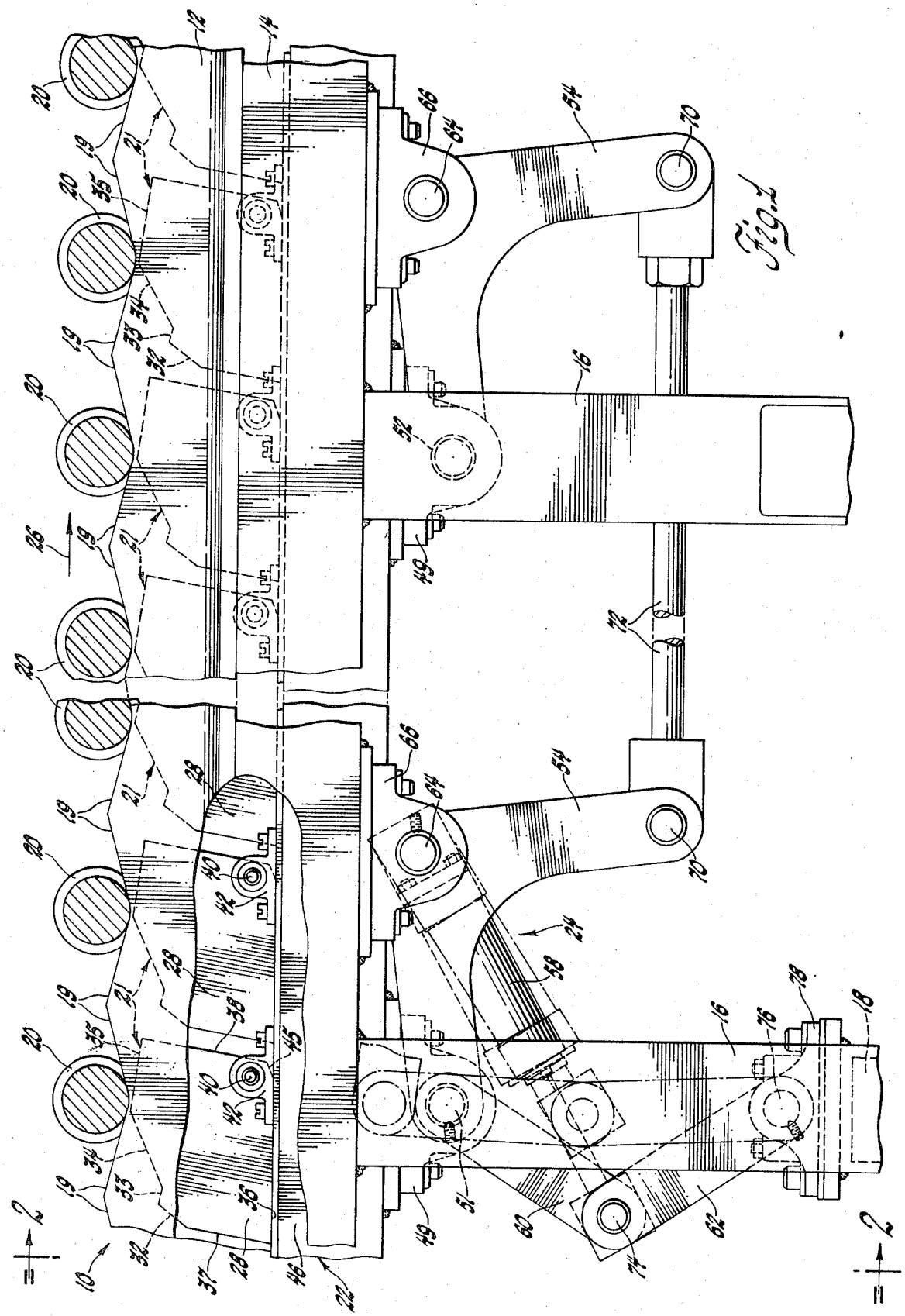
FIG. 1 is an elevation side view of a conveyor made in accordance with the invention for moving cylindrical parts.
Figure 2:
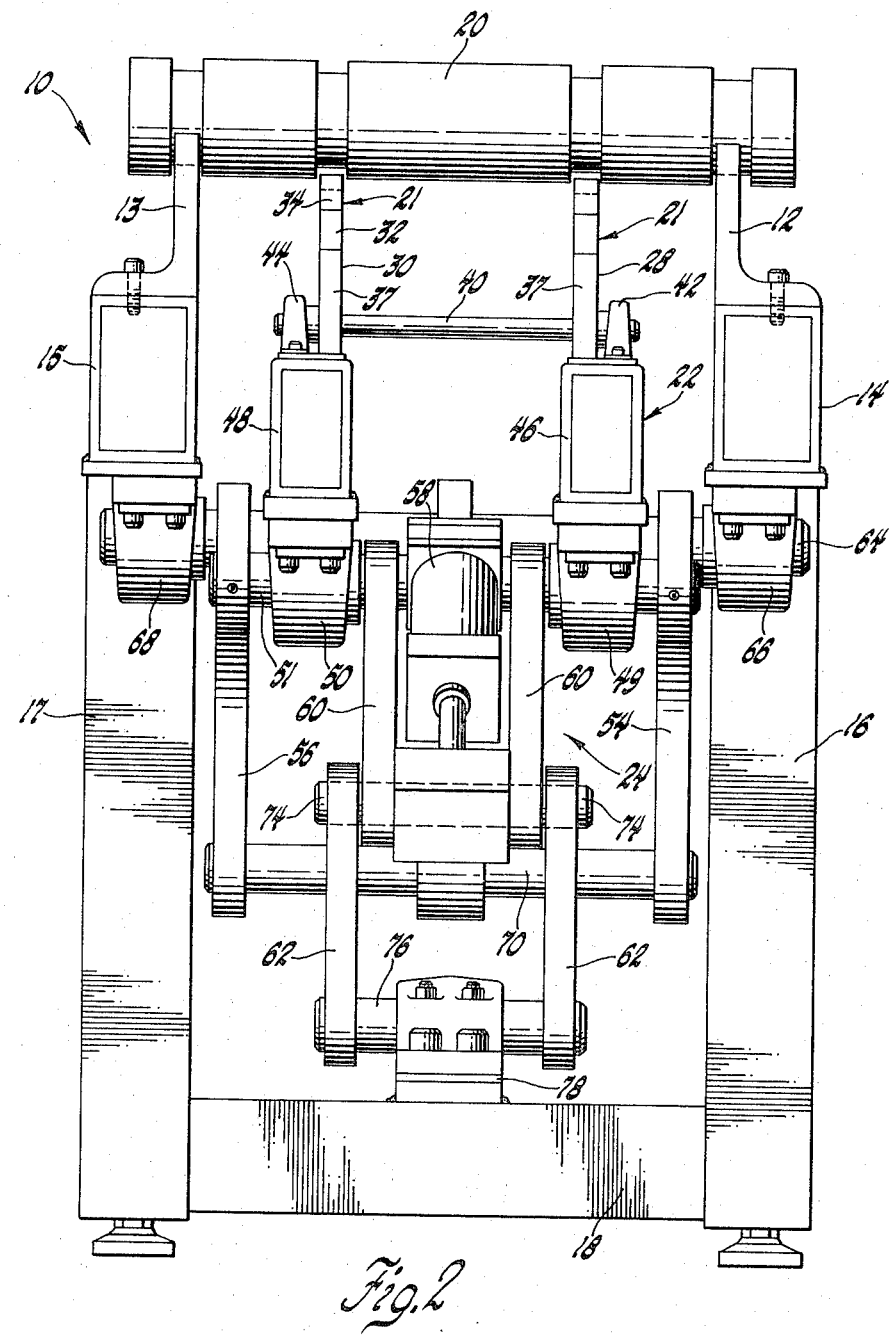
FIG. 2 is an end view of the conveyor of FIG. 1 taken along lines 2—2.

Referring to the drawings and more specifically FIGS. 1 and 2 thereof, a material handling elongated conveyor 10 is shown having an entrance end located at the left hand portion of the drawing and an exit end located at the right hand portion of the drawing. The conveyor generally comprises a pair of parallel upstanding support plates 12 and 13 which, as seen in FIG. 2, are laterally spaced and respectively supported at the lower ends thereof by side rails 14 and 15 which in turn are supported by two longitudinal spaced sets of vertical stanchions 16 and 17. Each pair of stanchions 16 and 17 has the lower end thereof interconnected by a transverse cross bar 18 so as to form a rigid frame which can be positioned in a manufacturing plant adjacent automatic material handling apparatuses which may serve to deposit cylindrical parts onto the entrance end of the conveyor and remove parts from the exit end of the conveyor 10.

The upper portion of each of the support plates 12 and 13 is formed with a series of V-shaped notches 19 which are identical in size and uniformly spaced along the longitudinal axis of the conveyor 10. Each pair of laterally spaced notches is adapted to support one of a plurality of cylindrical parts 20 with the longitudinal axis thereof extending substantially normal to the longitudinal axis of the support plates 12 and 13. A drive assembly including a plurality of identical positioning members 21, a lifter member 22 and an operating mechanism 24 are located between the support plates 12 and 13 for causing the cylindrical parts 20 to be moved successively in the direction of the arrow 26 from the entrance end to the exit end of the conveyor 10.

Each positioning member 21 consists of a pair of identical and laterally spaced sections 28 and 30 each of which has the upper portion thereof formed with four angularly related surfaces 32, 33, 34 and 35, a base edge 36, and side edges 37 and 38. The surfaces 32-35 cooperate with the notches 19 formed in the support plates 12 and 13 for controlling movement of the cylindrical parts 20 from the entrance end to the exit end of the conveyor 10. Each section 28 and 30 has surfaces 32 and 34 thereof located in planes which are inclined downwardly towards the entrance end of the conveyor 10 while surfaces 33 and 35 are located in planes which are inclined downwardly towards the exit end of the conveyor 10. Moreover, each pair of transversely aligned sections 28 and 30 are rigidly interconnected by a transverse shaft 40 the opposite ends of which are rotatably journaled in bearing members 42 and 44 carried by the lifter member 22. Thus, the shaft 40 serves as a pivotal connection for the positioning member 21 that is located below surface 35 and between the lowest points of a pair of adjoining notches 19. It will be noted that the positioning member normally rests on the upper surface of the lifter member as seen in FIGS. 1 and 2, and that adjacent the shaft 40, the lower right hand corner of each positioning member 21 is formed with an inclined stop surface 45. Thus, clockwise rotation of the positioning member 21 from the rest position is limited to the angle shown in FIGS. 4 and 5 when stop surface 45 contacts the lifter member 22.

As seen in FIGS. 1 and 2, the lifter member 22 includes a pair of laterally spaced rails 46 and 48 which through bearing members 49, 50 are supported and interconnected by longitudinally spaced shafts 51 and 52 each of which has the opposite ends thereof secured to one end of a pair of identical transversely spaced bell cranks 54 and 56. The bell cranks 54 and 56 form a part of the operating mechanism 24 which includes an actuating cylinder 58 and a drive linkage consisting of link members 60 and 62. Each pair of transversely aligned bell cranks 54 and 56 are rigidly connected to a shaft 64 the opposite ends of which are rotatably journaled in bearing members 66 and 68 respectively secured to the underside of side rails 14 and 15. The lower ends of the bell cranks 54 and 56 are interconnected by a pivot shaft 70. A rod 72 extends between the pivot shafts 70 of each pair of bell cranks 54 and 56 so as to join the latter for concomitant movement. As seen in FIG. 2, the link members 60 have the upper ends thereof pivotally mounted on the shaft 51 while the lower ends are pivotally mounted on a shaft 74 which serves as a common support for the rod end of actuating cylinder 58 and for the upper ends of link members 62. The lower ends of link member 62 are fixed with a shaft 76 which is rotatably supported by a bearing member 78 secured to the cross bar 18.

Thus, it should be apparent from the above description that upon contraction and extension of the actuating cylinder 58 the link members 60 and 62 move between the full line position of FIG. 1 wherein the link members are angled relative to each other to the phantom line position shown wherein the link members are substantially vertically aligned. This movement in turn causes the lifter member 22 and accordingly the positioning members 21 to be alternately raised and lowered under the control of the two sets of bell cranks 54 and 56.

The operation of the conveyor 10 described above is as follows: Assuming all of the notches 19 in the support plates 12 and 13 are filled with cylindrical parts 20, then upward movement of the lifter member 22 causes the parts 20 to move through the positions shown in FIG. 3, 4 and 5. In this regard, as the positioning members 21 are raised from the location shown in FIG. 3, the surface 35 initially contacts the lower portion of the cylindrical part 20 at a point to the left of a vertical line passing through the center of the cylindrical part 20. As the positioning member 21 continues to rise, the cylindrical part 20 begins to roll to the right along the inclined surface 35 until it reaches a point where the center of gravity of the cylindrical part is to the right of the center axis of the shaft 40. At this point, the positioning member 21 tilts clockwise about its pivotal connection to the position seen in FIG. 4. The adjacent positioning member 21 experiences the same movements and accordingly permits surface 32 to raise upwardly and cooperate with surface 35 of the preceding positioning member for providing a seat for the cylindrical part 20. Continued upward movement of the positioning members 21 causes the cylindrical parts 20 to be raised upwardly to the position seen in FIG. 5. The arrangement of parts, as seen in FIG. 5, is realized when the actuating cylinder 58 is fully contracted and the link members 60 and 62 are substantially vertically aligned as seen in phantom-lines in FIG. 1. Through appropriate valving, not shown, the actuating cylinder 58 then starts to expand so that the link members 60 and 62 move from the phantom-line position towards the full line position. As aforementioned, this causes the lifter member 22 to be lowered so that the positioning members 21 then move progressively from the position in FIG. 5 to the position in FIG. 4 and finally to the position in FIG. 3 which is the starting position. During the latter movement each cylindrical part 20 is returned to the same notch 19 from which it was removed.

Assuming one of the cylindrical parts 20 is removed from the conveyor 10, then all of the preceding positioning members 21 experience the successive movements I through IV shown in FIG. 6. In other words, as the positioning member 21 is raised from the FIG. 3 position, the cylindrical part 20 is contacted in the same manner as explained above causing the cylindrical part 20 to be raised from position I to position II at which point it moves down the surface 35 and produces a clockwise pivoting action of the positioning member 21. However, inasmuch as the succeeding notch 19 is empty, the positioning member 21 associated therewith is raised vertically upwardly without any tilting movement thereof. As a result, the surface 33 of the succeeding positioning member 21 assumes the position shown in FIG. 4 wherein it is located at a lower level then surface 35 of the preceding positioning member 21 and serves to receive the cylindrical part 20 as seen in the full line position III. When the positioning members 21 are then lowered to the position of FIG. 3, the cylindrical part 21 is then deposited on the left side of the V-shaped notch 14 permitting it to roll there along to the final position IV. The same occurs to all of the cylindrical parts preceding the empty notch.

It should be apparent from the above that in order for the conveyor 10 to operate properly, a certain size and shape relationship must exist between the surfaces 32–35 formed on the upper portion of each positioning member 21, the V-shaped notch 19, and the location of the axis of support pivot shaft 40 of each the positioning members. For example, in order for the surface 35 to cause the cylindrical part 20 to roll to the right after initial contact therewith, the leftward end of surface 35 must be positioned to the left of a vertical plane through the center of gravity of the cylindrical part. Moreover, the shaft 40 must be so located so as to permit the positioning member 21 to tilt in a clockwise direction to assume the position of FIG. 4. In addition, the surfaces 32 and 33 must be so positioned and inclined so they cooperate with surface 35 of the preceding positioning member for raising or receiving the cylindrical part as explained hereinbefore.

One conveyor made according with the invention which has been built and successfully tested used positioning members 21 each of which had the rotational axis of shaft 40 positioned at a height of 1.0 inch relative to the base edge 36 and located along a line parallel to and spaced 0.75 inches from side edge 38. The surface 35 had a length of 3.50 inches and formed an included angle of 90° with side edge 38 which was inclined 10° relative to the vertical. Surface 34 measured 3.50 inches and formed an included angle of 146° with surface 35 while surface 33 had a length of 0.812 inches and formed an included angle of 146° with surface 34. Surface 32 had a dimension equal to 1.75 inches and formed an included angle of 120° with surface 33. The horizontal distance between the rotational axes of each pair longitudinally spaced positioning members 21 was 9.0 inches and the horizontal distance between a vertical line passing throughh the rotational axis of each positioning member 21 and the lowest point of the notch 19 directly above the latter member was 1.25 inches. The cylindrical parts 20 had a diameter of 3.25 inches and the horizontal distance between the centers of each pair of cylindrical parts when all notches were filled as seen in FIG. 1 was 9.0 inches. The included angle of each V-shaped notch was 150° and each side wall defining the notch measured 4.62 inches. The stop surface 45 was so located on each positioning member 21 so as to limit clockwise rotation thereof to 16° as seen in FIG. 4.

Various changes and modifications can be made in this construction without departing from the spirit of the invention. Such changes and modifications are contemplated by the inventor and he does not wish to be limited except by the scope of the appended claims.

I claim:

1. A conveyor for moving cylindrical parts is a direction substantially perpendicular to the longitudinal axes of said parts, said conveyor having an entrance end for receiving cylindrical parts and an exit end from which said cylindrical parts are removed and comprising a pair of laterally spaced support plates, a series of equally spaced and uniform notches formed in the upper portion of each of said support plates for supporting and spacing said cylindrical parts, a plurality of identically formed positioning members located between said support plates, the upper portion of each of said positioning members comprising first, second, third, and fourth angularly related surfaces for cooperation with said notches for controlling and guiding successive movement of the cylindrical parts from one notch to the next notch from the entrance end to the exit end of the conveyor, said first, second, third and fourth surfaces being arranged consecutively on each positioning member from the entrance end to the exit end and having the first and third surface inclined downwardly towards the entrance end and the second and fourth surfaces inclined downwardly toward the exit end, and means supporting each of the positioning members adjacent one of said notches so when each of the notches is filled with a cylindrical part upward and then downward movement of the positioning members relative to the support plates causes the cylindrical parts to be removed from the notches by the first and fourth surfaces of each adjacent pair of positioning members and returned to the same notches from which the cylindrical parts were removed, but when one of said notches is empty upward and then downward movement of the positioning members causes the cylindrical parts preceding the empty notch to be cammed by the fourth surface of one positioning member onto the second surface of the adjacent positioning member and deposited thereby in the associated notch.

2. A conveyor for moving individual cylindrical parts in a direction substantially perpendicular to the longitudinal axes of said parts and having an entrance end for receiving cylindrical parts and an exit end from which said cylindrical parts are removed, the entrance end and said exit end being spaced along the longitudinal axis of the conveyor, said conveyor comprising a pair of laterally spaced support plates, a series of equally spaced and identical notches formed in the upper portion of each of said support plates for supporting and spacing said individual cylindrical parts, a lifter member supported for vertical movement between the support plates, a plurality of identical positioning members located between said support plates and along said longitudinal axis of the conveyor, the upper portion of each of said positioninng members comprising first, second, third, and fourth angularly related surfaces for cooperation with said notches for controlling successive movement of the cylindrical parts from one notch to the next notch from the entrance end to the exit end of the conveyor, said surfaces being arranged consecutively on each positioning member from the entrance end to the exit end and having the first and third surfaces inclined downwardly towards the entrance end and the second and fourth surfaces inclined downwardly toward the exit end, drive means connected to said lifter member for raising and lowering the latter, and means pivotally supporting each of the positioning members on the lifter member below one of said notches so when each of the notches is filled with a cylindrical part upward and then downward movement of the positioning members relative to the support plates causes the cylindrical parts to be removed from the notches by the first and fourth surfaces of each adjacent pair of positioning members and returned to the same notches from which the cylindrical parts were removed, but when one of said notches is empty upward and then downward movement of the positioning members causes the cylindrical parts preceding the empty notch to be simultaneously moved by the fourth surface of one positioning member onto the second surface of the adjacent positioning member and deposited thereby in the associated notch.

3. An elongated conveyor for moving individual cylindrical parts in a direction substantially perpendicular to the longitudinal axes of said parts, said conveyor having an entrance end for receiving cylindrical parts and an exit end from which said cylindrical parts are removed, said entrance end and said exit end being spaced along the longitudinal axis of the conveyor, said conveyor comprising a pair of laterally spaced support plates located in parallel and vertically oriented planes relative to the longitudinal axis of the conveyor, a series of equally spaced and uniform V-shaped notches formed in the upper portion of each of said support plates for supporting and spacing said individual cylindrical parts, a lifter member supported for vertical mmovement between the support plates, a plurality of positioning members located between said support plates, the upper portion of each of said positioning members comprising first, second, third, and fourth angularly related surfaces for cooperation with said notches for controlling and guiding successive movement of the cylindrical parts from one notch to the next notch from the entrance end to the exit end of the conveyor, said surfaces being arranged consecutively on each positioning member from the entrance end to the exit end and having the first and third surfaces located in transverse planes inclined downwardly towards the entrance end and the second and fourth surfaces located in transverse planes inclined downwardly toward the exit end, drive means connected to said lifter member for raising and lowering the latter, means pivotally supporting each of the positioning members on the lifter member at a point below the fourth surface so when each of the notches is filled with a cylindrical part upward and then downward movement of the positioning members relative to the support plates causes the cylindrical parts to be removed from the notches by the first and fourth surfaces of each adjacent pair of positioning members and returned to the same notches from which the cylindrical parts were removed, but when one of said notches is empty upward and then downward movement of the positioning members causes the cylindrical parts preceding the empty notch to be cammed by the fourth surface of one positioning member onto the second surface of the adjacent positioning member and deposited thereby in the associated notch, and stop means formed with each of said positioning members for limiting pivotal movement thereof in the direction of said exit end.

* * * * *